United States Patent [19]

Grimaud et al.

[11] 4,076,699

[45] Feb. 28, 1978

[54] ALKALI SALTS OF A SULPHONATED STYRENE POLYMER OR COPOLYMER AS FLUIDIZING AGENTS AND A PROCESS FOR PREPARING THE SAME

[75] Inventors: Edouard Grimaud, Saint Genis Laval; Robert Koeppel, Bron, both of France

[73] Assignee: Produits Chimiques Ugine Kuhlmann, Paris, France

[21] Appl. No.: 621,353

[22] Filed: Oct. 10, 1975

[30] Foreign Application Priority Data

Oct. 16, 1974 France .................. 74 34731

[51] Int. Cl.$^2$ .................. C04B 7/02; C08G 75/18
[52] U.S. Cl. .................. 260/79.5 C; 106/90; 260/79.3 R; 260/79.5 NV; 260/686; 526/19; 526/21; 526/41; 526/222
[58] Field of Search .................. 260/79.3 R, 79.5 NV, 260/79.5 C, 686; 106/90; 526/41, 19, 21, 227, 222

[56] References Cited

U.S. PATENT DOCUMENTS

| 2,691,644 | 10/1954 | Roth | 260/79.3 R |
| 2,763,634 | 9/1956 | Teot | 260/686 |
| 2,813,087 | 11/1957 | Roth | 260/686 |
| 2,835,655 | 5/1958 | Bauman et al. | 260/79.5 NV |
| 3,078,241 | 2/1963 | Hibbard et al. | 260/17.4 |
| 3,158,583 | 11/1964 | Corte et al. | 260/686 |
| 3,393,160 | 7/1968 | Corte et al. | 260/686 |
| 3,630,937 | 12/1971 | Baum et al. | 260/686 |
| 3,758,319 | 9/1973 | Ergene | 106/90 |
| 3,772,051 | 11/1973 | Shearing | 106/90 |
| 3,960,821 | 6/1976 | Vogt et al. | 260/79.5 C |

FOREIGN PATENT DOCUMENTS

| 920,898 | 3/1963 | United Kingdom | 260/79.3 |

*Primary Examiner*—Ronald W. Griffin
*Attorney, Agent, or Firm*—Pennie & Edmonds

[57] ABSTRACT

This invention relates to alkali salts of a sulphonated styrene polymer or copolymer having a degree of polymerization of less than about 140, to a process for their preparation, to their use as fluidizing agents for mineral binders and to mineral binders having the fluidizing agents incorporated therein.

9 Claims, No Drawings

ALKALI SALTS OF A SULPHONATED STYRENE POLYMER OR COPOLYMER AS FLUIDIZING AGENTS AND A PROCESS FOR PREPARING THE SAME

BACKGROUND OF THE INVENTION

1. Field of the Invention

This invention relates to alkali salts of a sulphonated styrene polymer or copolymer and the process for preparing the same. The invention also relates to the use of these alkali salts of a sulphonated styrene polymer or copolymer as fluidizing agents for use with mineral binders.

2. Description of the Prior Art

It is known that in order to bring mineral binders such as cement, lime hydraulic lime, plaster of anhydrite, used either alone or mixed with additives, into a form which makes it possible to work them, it is necessary to mix them with a proportion of water which appreciably exceeds that required by the mechanical reaction. It accordingly follows that after setting of the mineral binder has taken place, the excess water has to evaporate, which has the effect of leaving cavities in the constructional unit. These cavities considerably reduce the mechanical strength of the constructional unit.

It is likewise known that fluidizing agents of various forms may be advantageously incorporated with mineral binders. These fluidizing agents hve the dual function of serving to disperse the particles of the mineral binders as well as to finely distribute the air contained in the mixture, the air being entrapped in the course of handling and mixing the mineral binders. As a result of these two phenomena, there is brought about an improved liquification or flowability of the binders as well as an improved workability of the mineral binders.

There are presently available fluidizing agents which are known to exhibit the above fluidizing characteristics. Examples of these fluidizing agents are the sodium salts of condensation products of naphthalene-$\beta$-sulphonic acid with formaldehyde, sodium laurylsulphate, the butyl ester of sulphonated ricinoleic acid or sulphated isobutyl oleate.

Unfortunately, all of these products have the inherent disadvantage of considerably decreasing the setting time of the mineral binders and may in fact tend to completely prevent setting. Likewise, these products have the effect of causing considerable sweating — the binder no longer retains the water with which it was mixed — thus adversely affecting the mechanical properties of the constructional unit.

There are also known to exist other fluidizing agents which are sulfide modified resins on a base of phenol/formaldehyde, melamine/formaldehyde or aminotriazine. These products have formed the subject of the following French Patents: Nos. 2,182,825 of Badische Aniline & Soda Fabrik, No. 1,510,314 of Suddeutsche Kalkstickstoff Werke, No. 1,570,149 of Hollfritsch, No. 2,042,860 and No. 2,059,288 of Hollfritsch.

While these products do not prevent setting of the mineral binder, their liquification power is weak and in certain cases they too give rise to sweating.

SUMMARY OF THE INVENTION

The instant invention relates to alkali salts of a sulphonated styrene polymer or copolymer having a degree of polymerization of less than about 140 and to a process for their preparation. The invention also relates to the use of these alkali salts as fluidizing agents for use with mineral binders and to mineral binders having the fluidizing agents incorporated therein.

The process of the instant invention, which is described in more detail hereinbelow, comprises:
a. telomerizing a styrene monomer to a degree of polymerization of less than about 140;
b. sulphonating the resulting polymer by means of an acid sulphonating agent; and
c. neutralizing the resulting sulphonic acid with an alkaline liquor.

The telomerization of the monomer may be carried out in the presence of any conventionally known telogenating agent and organic peroxide initiator. The alkali salts may also be produced by carrying out the sulphonation step in two stages, each stage being at a different temperature. Likewise the process of the instant invention may be carried out by simultaneous telomorization and sulphonation, that is, the above steps (a) and (b) will be carried out simultaneously. The resulting suspension will then be neutralized with an alkaline liquor.

The invention likewise relates to the use of the alkali salts of the process of this invention as fluidizing agents for mineral binds and to mineral binders having incorporated therein between about 0.01 to about 10% by weight of the alkali salt.

While alkali polystyrene sulphonates generally are known and known to be useful as thickeners, the specific novel alkali salts of a sulphonated styrene polymer or copolymer as produced by the instant invention overcome the aforementioned disadvantages of known fluidizing agents by simultaneously possessing good fluidizing power, yielding improved setting time which makes the application of the binder much more convenient, avoiding sweating and improving the mechanical properties of the constructional unit.

DESCRIPTION OF THE PREFERRED EMBODIMENTS

Particularly interesting fluidizing properties are obtained if one uses an alkali salt of a sulphonated styrene polymer or copolymers having a degree of polymerization of less than about 140, and preferably, less than about 50 and produced by the process of this invention.

The process for the preparation of the alkali salts of sulphonated styrene polymers or copolymers of the instant invention comprises polymerization by radical telomerization of styrene in the presence of a telogenating agent or chain transfer agent and an organic peroxide conventionally employed as an initiator such that the degree of polymerization is less than about 140, and preferably less than about 50.

While any conventional telogenating agent or chain transfer agent may be employed, i.e. carbon tetrachloride, trichloromethane, hydrogen chloride, acetadehyde hydrogen, etc., it is preferable to utilize carbon tetrachloride. Likewise, any conventional and well known organic peroxide initiator may be employed such as lauroyl peroxide, diisopropyl peroxy carbonate, caprylyl peroxide, benzoyl peroxide, dicumyl peroxide, tert-butyl hydroperoxide, methyl ethyl ketone peroxide etc. See generally encyclopedia of polymer Science and Technology, Interscience (1965), Vol. 3, pages 605–606 and Vol. 5, pages 824–828. The degree of polymerization or telomerization is easily ascertained by one skilled in the art and may likewise be easily achieved as by stopping polymerization by cooling. Beyond the required degree of polymerization, the exact amounts of reactants to be employed as well as the particular operating temperature, pressure, degree of agitation, and required reaction time conditions are not critical and are most easily determined by one skilled in the art. It is however preferable to carry out the telomerization step above ambient temperatures.

The resulting mixture containing the polymerized product may be further treated directly or the polystyrene product may be first isolated by known means such as precipitation and then redissolved with any suitable chlorinated solvent, such as 1, 2-dichloroethane. Whether the polymerized products is treated directly or first isolated and then redissolved, the product of the telomerization step is then sulphonated by the addition thereto of an acid sulphonating agent such as concentrated sulphuric acid, oleum or chlorosulphonic acid which simultaneously causes the cationic polymerization of any residual unpolymerized styrene as well as causing the sulphonation of the whole of the polystyrene present to yield a polystyrene sulphonic acid suspension. Again, no particular quantity of reactants or operating conditions are critical to the successful sulphonation of the styrene polymer.

The resulting polystyrene sulphonic acid suspension is then neutralized with an alkaline liquor, any of the very many conventional and well known alkaline liquors being suitable such as NaOH, KOH, $Ca(OH)_2$, $Na_2CO_3$, $NaHCO_3$ etc . . There is thus obtained the corresponding alkali salt.

In the same manner above described for the polymerization of styrene, any substituted styrene monomer may also be advantageously employed to yield the alkali salts of the corresponding substituted styrene polymer, the only limitation on the extent of styrene substitution being that the polymerized product not interfere with the novel use and purpose of the instant invention. Exemplarily, the substituted styrene monomer may be halogenated styrenes such as chlorostyrenes, nitrososty-renes, vinyltoluenes, vinylxylenes, α-methylstyrene.

Likewise, and in the same manner above described for the polymerization of styrene, any styrene or substituted styrene monomer may be copolymerized to yield the alkali salts of the corresponding styrene or substituted styrene copolymer, the only limitation on the degree of styrene copolymerization being that the copolymerized product not interfere with the novel use and purpose of the instant invention.

It may happen that in carrying out the above described sulphonation step the suspension formed may tend to settle out. This drawback may be avoided by carrying out the sulphonation step in two stages; in the first stage only a part of the acid sulphonating agent is introduced at ambient temperature. In the second stage, the temperature is raised from about 40° C to about 50° C with concurrent agitation after which the remainder of the acid sulphonating agent is added. The two stage operation of the sulphonation step prevents the settling out of the suspension.

The above described process may also be carried out in such a manner that telomerization, by cationic mechanism, and sulphonation are carried out simultaneously, that is, the above described steps (a) and (b) are carried out simultaneously. In this case, the acid sulphonating agent is slowly added to the styrene accompanied by vigorous agitation. The resulting polystyrene or copolystyrene sulphonic acid is then neutralized with an alkaline liquor so as to obtain the corresponding alkali salt.

The alkali salts of a sulphonated polystyrene polymer or copolymer produced by the process of this invention may be used either in the dry state or dissolved in water and may advantageously be added to any mineral binder, i.e. anhydrite, cement, lime, hydraulic lime, plaster, etc., either alone or mixed with additives. Particularly good results are obtained when the mineral binders have incorporated therein from about .01% to about 10% by weight of the fluidizing agents of this invention. The use of the mineral binders containing the fluidizing agents of this invention for the preparation of self-smoothing slabs is also particularly advantageous.

In order to minimize as much as possible the presence of air bubbles in the constructional unit, one may add to the mineral binder, together with fluidizing agents of the instant invention, anti frothing agents. Numerous anti-froth agent capable of suitably being incorporated are available on the market, for example the products sold under the trademark EMKALYX-PLURONIC L62 and TETRONIC 701 by Societe des Produits chimiques Ugine Kuhlmann. As regards the quanity of anti-froth agent to be incorporated, this is of course of no significance to the instant invention and one usually conforms with the instructions given by the supplier.

When the addition of fluidizing agents causes a particularly high degree of fluidization of the mineral binder, it is helpful to add one or more substances which slow down sedimentation. One may preferably add water-soluble cellulose ethers such as methylcellulose, carboxymethylcellulose, hydroxyethylcellulose or hydroxymethylcellulose at the rate of between about 0.001 to 1g per 100g of the mineral binder.

The following examples illustrate the present invention but do not restrict it.

EXAMPLE 1

Polymerization of styrene is carried out by mixing 400g of styrene and 1,600g of $CCl_4$ and 12g of lauroyl peroxide and heating the same to 80° C. After 4 hours an additional 12g of lauroyl peroxide are added. The polymerization is stopped after 8 hours and the polystyrene is isolated by precipitation with methyl alcohol. The molecular weight of the polystyrene obtained is 4,350. 50g of the dry polystyrene thus prepared are dissolved in 940 mls of 1,2-dichloroethane to which is added, over a period of 1 hour at ambient temperature, 58g of chlorosulphonic acid dissolved in 58 mls of 1,2-dichloroethane. There is thus obtained a precipitate of polystyrene sulphonic acid which, after the elimination of the solvent, is dissolved in water and then neutralized with 51g of NaOH so as to give 107g of water-soluble resin.

In order to assess the fluidizing properties of an anhydrite mortar, the following composition is prepared:

| | |
|---|---|
| anhydrite ($CaSO_4$) | 100g |
| water | 24g |
| $K_2SO_4$ (activator) | 1g |
| resin | 1g |

To measure the fluidity of the mortars one uses a dropping funnel of a volume of 250 mls ending in its lower part in a tube with an internal cross-section of 0.384 $cm^2$ and a length of 6 cm: one then determines the speed of flow of 100 mls of the mixture, equivalent to the height of the column of liquid passing from 20 to 11 cm above the orifice of flow. The fluidity is expressed in kg per hour.

A fluidity of 5.3 kg/hour is accordingly measured.

EXAMPLE 2

Polymerization of styrene is carried out at 80° C using 1,000g of styrene, 4,000g of carbon tetrachloride and 30g of lauroyl peroxide. An additional 30g of lauroyl peroxide are added after 4 hours. The polymerization is stopped after 8 hours, allowing the temperature to return to ambient temperature. The weight of polystyrene obtained, calculated on the basis of the dry extract, is 1,040g. 480g of the solution thus obtained is diluted with 1,547 cm³ of dichlorethane to obtain a mixture of 1,887 mls, to which is added 113g of chlorosulphonic acid diluted in 113 mls of dichlorethane. The polystyrene sulphonic acid obtained is dissolved in water and neutralized with 50.5g of NaOH so as to give 250g of water-soluble resin.

An anhydrite mortar according to the formula of Example 1 prepared with this resin has a fluidity of 9.0 kg/hour.

The flexural tensile strength is 61 bars after 7 days and 83 bars after 28 days. The compressive strength is 242 bars after 7 days and 433 bars after 28 days.

If, by way of comparison, one prepares an anhydrite mortar according to the formula of Example 1 but not containing the resin, there is obtained a mortar of zero fluidity, a flexural tensile strength of 47 bars after 7 days and 77 bars after 28 days and whose compressive strength is 275 bars after 7 days and 421 bars after 28 days.

EXAMPLE 3

To assess the fluidizing properties of a cement mortar, the following mixture is prepared:

| | |
|---|---|
| Portland cement (artificial cement) | 100g |
| water | 32g |
| the resin of Example 2 | 1g | the fluidity is measured by the method described in Example 1. With the resin of Example 2 a fluidity of 19.0 kg/hour is obtained.

EXAMPLE 4

To 480g of the solution obtained in the polymerization described in Example 2 there is added, at ambient temperature, a solution containing 113g of chlorosulphonic acid in 1,650 mls of dichlorethane. The polystyrene sulphonic acid obtained is dissolved in water and neutralized with 80g of KOH to give 223g of water-soluble resin.

Using this resin, the fluidity of the anhydrite mortar of Example 1 is 9.1 kg/hour and that of the cement mortar of Example 3 is 13.0 kg/hour.

EXAMPLE 5

Polymerization is carried out with 2,000g of styrene in accordance with Example 2. At the end of the polymerization step and after cooling to 25° C, sulphonation is performed by slowly adding 2,220g of chlorosulphonic acid over a period of about 6 hours. There is thus obtained a suspension of particles of polystyrene sulphonic acid. After filtration and washing with carbon tetrachloride the product is dissolved in water and neutralized with 1,000g of NaOH so as to give 4,200g of water-soluble resin.

The anhydrite mortar of Example 1 prepared with this resin has a fluidity of 9.6 kg/hour. The flexural tensile strength is 70 bars after 7 days and the compressive strength is 268 bars after 7 days.

EXAMPLE 6

To 240g of the polymerization mixture obtained in Example 2 there is slowly added, in two stages, 48.5g of chlorosulphonic acid, accompanied by vigorous agitation.

During the first stage, which lasts about 30 minutes and corresponds to the cationic polymerization of the styrene residue, 3.5g of chlorosulphonic acid are added at 25° C. The temperature is then slowly raised to 45° C so as to proceed to the second stage of sulphonation where 45.0g of chlorosulphonic acid are added over a 2 hour period, the sulphonation being continued at 45° C for 1 hour. Operating at 45° C during the second stage avoids any risk of setting of the suspension.

After filtration and washing, the polystyrene sulphonic acid is dissolved in water and neutralized with 19.6g of NaOH to give 90g of water-soluble resin.

At the end of the sulphonation, filtration of the resin may be avoided by pouring water directly into the suspension of polystyrene sulphonic acid in carbon tetrachloride. In this way there is obtained an aqueous solution of polystyrene sulphonic acid and an emulsion of carbon tetrachloride in water. During the neutralization with alkaline liquor the emulsion is broken and it is possible to separate carbon tetrachloride by decanting. It is also possible to do away with the intermediate operation of dissolving the polystyrene sulphonic acid in water by adding the alkaline solution directly to the suspension of polystyrene sulphonic acid in carbon tetrachloride.

The anhydrite mortar of Example 1 prepared with this resin has a fluidity of 8.0 kg/hour. After 7 days the flexural tensile strength is 66 bars and the compressive strength is 243 bars.

EXAMPLE 7

To 150g of styrene dissolved in 2,500 mls of dichlorethane is added, at ambient temperature, 170g of chlorosulphonic acid dissolved in 500 mls of dichlorethane, and it is allowed to react. After the elimination of the solvent the polystyrene sulphonic acid is dissolved in water. One-half of the solution obtained is neutralized with NaOH to give 170g of water-soluble sodium polystyrene sulphonate.

The anhydrite mortar of Example 1 prepared with this resin has a fluidity of 8.0 kg/hour.

EXAMPLE 8

Polymerization is carried out at 80° C using 400g of vinyltoluene, 1,600g $CCl_4$ and 12g of lauroyl peroxide. After 4 hours, an additional 12g of lauroyl peroxide is added. After 8 hours the polymerization is stopped by letting it come back to room temperature. The weight of polyvinyltoluene obtained, calculated on the basis of the dry extract, is 392g. To 1,000g of the mixture obtained there is slowly added in two stages, accompanied with strong agitation, 200g of chlorosulphonic acid.

During the first stage, which lasts about 30 minutes and corresponds to the cationic polymerization of the styrene residue, 17g of chlorosulphonic acid are added at 25° C. The temperature is then slowly raised to 45° C so as to proceed to the second stage of sulphonation, where 183g of chlorosulphonic acid are added over a period of 2 hours, the sulphonation being continued at 45° C for 1 hour. Operating at 45° C during the second stage avoids any risk of the suspension setting.

After filtering and washing, the polyvinyltoluene sulphonic acid is dissolved in water and neutralized with a soda solution to give 400g of water-soluble resin.

The anhydrite mortar of Example 1 prepared with this resin has a fluidity of 9.0 kg/hour.

We claim:

1. A process for the manufacture of alkali salts of a sulphonated polystyrene polymer or copolymer which comprises:
   a. telomerizing a styrene monomer to a degree a polymerization of less than about 140;
   b. sulphonating the resulting polymer by means of an acid sulphonating agent, said sulphonation being carried out in two stages which comprises reacting in a first stage the styrene polymer with a portion less than all of the acid sulphonating agent at ambient temperature and then adding the balance of the acid sulphonating agent in a second stage at a temperature of from about 40° C to about 50° C; and
   c. neutralizing the resulting sulphonic acid with an alkaline liquor.

2. The process of claim 1 wherein the telomerization of step (a) is carried out in the presence of carbon tetrachloride as a telogenating agent and an organic peroxide as an initiator.

3. The process of claim 1 wherein the degree of polymerization is less than about 50.

4. The process of claim 1 wherein the telomerization is carried out above ambient temperatures.

5. The process of claim 1 wherein the telomerization of step (a) and the sulphonation of step (b) are carried out simultaneously.

6. The process of claim 1 wherein the sulphonating agent is sulphuric acid, oleum or chlorosulphonic acid.

7. Alkali salts of a sulphonated polystyrene polymer or copolymer produced by the process of claim 1.

8. A method of fluidizing mineral binders which comprises incorporating therein alkali salts of a sulphonated polystyrene polymer or copolymer as fluidizing agent, said alkali salts produced by the process of:
   a. telomerizing a styrene monomer to a degree of polymerization of less than about 140;
   b. sulphonating the resulting polymer by means of an acid sulphonating agent; and
   c. neutralizing the resulting sulphonic acid with an alkaline liquor.

9. Mineral binders having incorporated therein between about .01% to about 10% by weight of alkali salts of a sulphonated polystyrene polymer or copolymer, said alkali salts produced by the process which comprises:
   a. telomerizing a styrene monomer to a degree of polymerization of less than about 140;
   b. sulphonating the resulting polymer by means of an acid sulphonating agent; and
   c. neutralizing the resulting sulphonic acid with an alkaline liquor.

* * * * *